(12) United States Patent
Tam

(10) Patent No.: US 8,171,234 B2
(45) Date of Patent: May 1, 2012

(54) MULTI-BANK MULTI-PORT ARCHITECTURE

(75) Inventor: Kit Sang Tam, Menlo Park, CA (US)

(73) Assignee: MoSys, Inc., Santa Clara, CA (US)

( * ) Notice: Subject to any disclaimer, the term of this patent is extended or adjusted under 35 U.S.C. 154(b) by 256 days.

(21) Appl. No.: 12/404,955

(22) Filed: Mar. 16, 2009

(65) Prior Publication Data

US 2010/0235590 A1    Sep. 16, 2010

(51) Int. Cl.
*G06F 12/00* (2006.01)

(52) U.S. Cl. ............. 711/149; 711/150; 711/E12.069

(58) Field of Classification Search .......... 711/149
See application file for complete search history.

(56) References Cited

U.S. PATENT DOCUMENTS

| | | | |
|---|---|---|---|
| 5,671,392 A | 9/1997 | Parris et al. | |
| 5,768,211 A * | 6/1998 | Jones et al. | ............. 365/230.05 |
| 5,875,470 A | 2/1999 | Dreibelbis et al. | |
| 5,923,593 A | 7/1999 | Hsu et al. | |
| 5,923,608 A | 7/1999 | Payne | |
| 6,366,989 B1 * | 4/2002 | Keskar et al. | ................. 711/167 |
| 6,393,504 B1 | 5/2002 | Leung et al. | |
| 7,280,427 B2 | 10/2007 | Shin | |
| 7,394,711 B2 | 7/2008 | Oh et al. | |
| 2003/0200422 A1 * | 10/2003 | Hironaka et al. | ............. 712/215 |

* cited by examiner

*Primary Examiner* — Reginald Bragdon
*Assistant Examiner* — Hamdy S Ahmed
(74) *Attorney, Agent, or Firm* — Bever, Hoffman & Harms, LLP; E. Eric Hoffman

(57) ABSTRACT

A memory system including a plurality of ports and a memory core having a plurality of memory banks. Access requests received at the ports are broadcast to the memory banks. Multiple memory banks may be concurrently accessed in response to access requests received on different ports. A memory controller provides the access requests to the memory system, and ensures that a single memory bank is not concurrently accessed by different ports. All access requests are processed with the same latency. If the memory banks include memory cells that must be periodically refreshed, then the memory controller also provides refresh requests to the memory banks. Because multiple memory banks may be concurrently accessed in response to access requests provided on different ports, the memory banks can operate at a lower frequency than the ports.

22 Claims, 11 Drawing Sheets

MULTI-BANK MULTI-PORT ARCHITECTURE

FIELD OF THE INVENTION

The present invention relates to a multi-port memory system that includes a core memory with a multi-bank architecture.

RELATED ART

Dynamic random access memory (DRAM) systems desirably have a high density, but undesirably require periodic refresh. DRAM systems are typically designed such that all necessary refresh operations are performed within a predetermined refresh period, even if a worst-case access pattern occurs. DRAM systems are also designed such that the refresh operations have minimal or no adverse effect on normal read and write accesses to the memory system. However, such DRAM systems typically require complex control circuitry, including, for example, refresh timer circuitry for periodically generating refresh request signals, access arbitration circuitry for determining whether to perform read/write operations or refresh operations, refresh counter circuitry for storing refresh requests that are not able to be immediately processed, read/write cache circuitry for ensuring that idle cycles are eventually available for processing refresh request and/or circuitry for forcing idle cycles to allow refresh requests to be processed.

Some DRAM systems may be operated in a predetermined manner wherein the worst-case access patterns for the periodic refresh will never exist. However, these DRAM systems still require the complex control circuitry associated with performing the refresh operations for worst-case access patterns. It would be desirable to have a flexible DRAM system that does not include the complex control circuitry associated with refresh operations, but rather, allows the refresh operations to be performed under user control, such that the refresh operations do not interfere with read/write operations to the DRAM system. It would further be desirable for such a DRAM system to have a low fixed access latency.

SUMMARY

Accordingly, the present invention provides a multi-port multi-bank architecture that includes a plurality of ports and a memory core having a plurality of memory banks. A memory controller provides read/write access requests to the ports, wherein access requests may be simultaneously provided to multiple ports. Each of the access requests received at the ports is broadcast to each of the memory banks. The memory banks decode the received access requests, and in response, determine whether to process the received access requests. Multiple different memory banks may be concurrently accessed in response to access requests received on different ports. However, the memory controller ensures that a single memory bank is not concurrently accessed by different ports. Error correction code (ECC) circuitry may be provided for each of the ports.

In one embodiment, each of the ports operates in response to a system clock signal. All read/write access requests are processed with the same latency, which may be, for example, two cycles of the system clock signal. Because multiple memory banks may be concurrently accessed in response to access requests provided on different ports, the memory banks can operate at a lower frequency than the ports. In one embodiment, the memory banks operate in response to an internal clock signal that has a frequency that is half the frequency of the system clock signal.

In one embodiment, each of the memory banks is constructed with DRAM cells, which must be periodically refreshed. In this embodiment, the memory controller also provides refresh requests to the memory banks. Refresh operations can be concurrently implemented in multiple memory banks (as long as these memory banks are not being accessed by read/write access requests). The complexity associated with the refresh operations is included in the memory controller, and not in the memory architecture of the present invention.

The present invention will be more fully understood in view of the following description and drawings.

DETAILED DESCRIPTION

Figure 1:
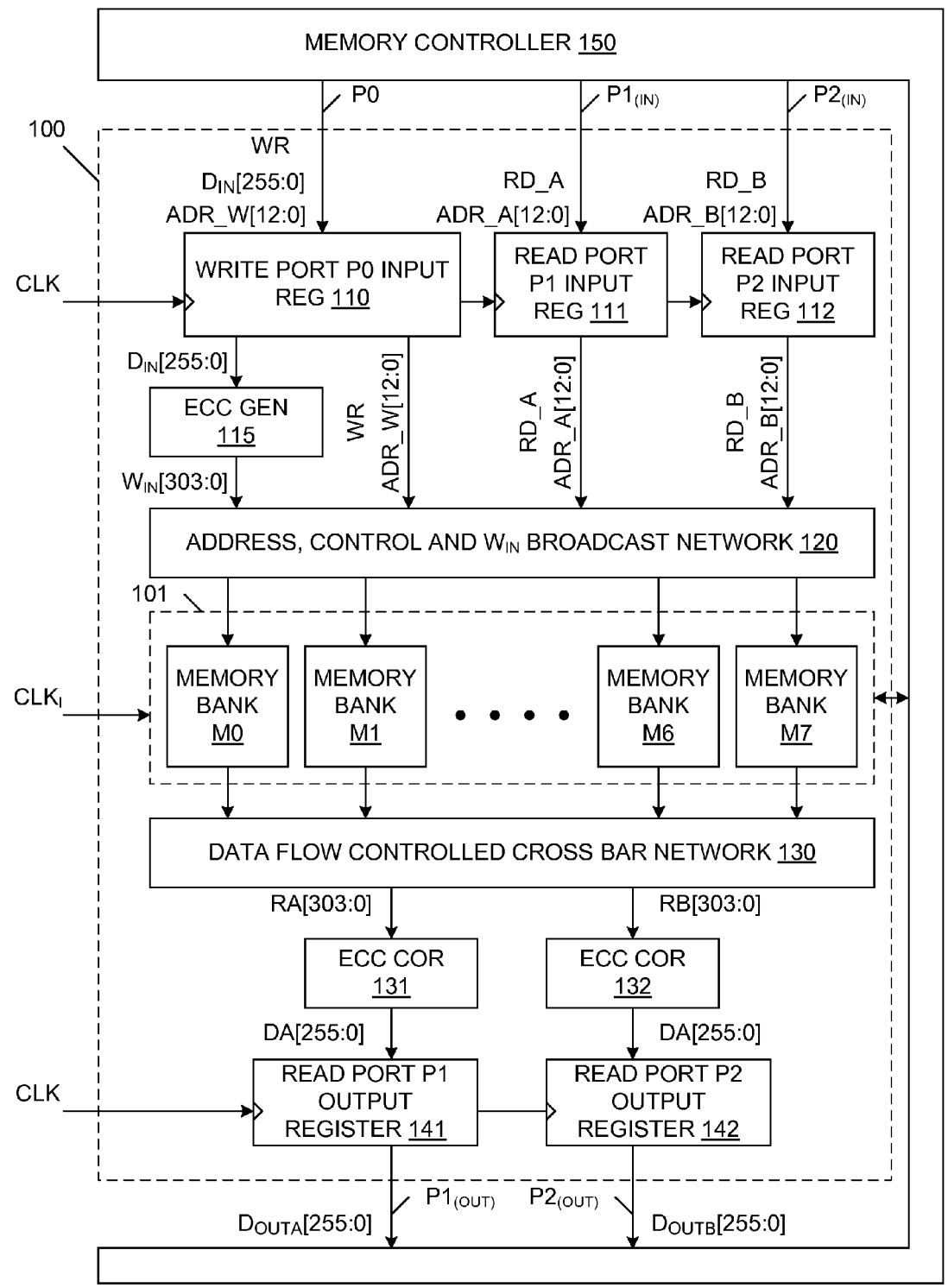
FIG. 1 is a block diagram of a three-port multi-bank memory system in accordance with one embodiment of the present invention.

FIG. 1 is a block diagram of a three-port multi-bank memory system 100 in accordance with one embodiment of the present invention. Three-port multi-bank memory system 100 includes write port P0, first read port P1 (which includes P1$_{(IN)}$ and P1$_{(OUT)}$), second read port P2 (which includes P2$_{(IN)}$ and P2$_{(OUT)}$), multi-bank memory core 101, write port P0 input register 110, read port P1 input register 111, read port P2 input register 112, error correction code (ECC) generator 115, broadcast network 120, cross-bar network 130, ECC correction blocks 131-132, read port P1 output register 141 and read port P2 output register 142. The write port P0 and the read ports P1-P2 are accessed by an external memory controller 150. In the described examples, the external memory controller 150 and the three ports P0-P2 operate in response to a system clock signal CLK having a frequency of 500 MHz.

Multi-bank memory core 101 includes eight memory banks M0-M7 (although other numbers of memory banks can be used in other embodiments). In the described embodiments, each of the memory banks M0-M7 includes an array of dynamic random access memory (DRAM) cells, which must be periodically refreshed. DRAM cells advantageously provide a high density to memory system 100. Each column within memory banks M0-M7 includes a corresponding sense amplifier, such that accesses to memory banks M0-M7 are performed in a page mode. In the described embodiments, each of the memory banks M0-M7 has a storage capacity of 1 k words (although these memory banks can have different capacities in other embodiments).

Memory controller 150 can initiate a write access to memory system 100 by activating a write control signal WR and providing a write address ADR_W[12:0] and a write data value $D_{IN}[255:0]$ to write port P0. These write signals are latched into write port input register 110 in response to the system clock signal CLK. In an alternate embodiment of the present invention, write port input register 110 may be omitted, assuming that signal timing and signal integrity requirements may be met without this register.

Write port input register 110 provides the latched write data value $D_{IN}[255:0]$ to ECC generator 115. In response, ECC generator 115 creates a write value $W_{IN}[303:0]$, which includes the original write data value $D_{IN}[255:0]$, plus a 48-bit ECC value generated in response to the original write data value $D_{IN}[255:0]$. Although ECC generator 115 generates a 48-bit ECC value in response to the received 256-bit write data value, it is understood that ECC values having other numbers of bits can be generated in other embodiments. Providing a single ECC generator 115 for all write data values advantageously reduces the layout area and cycle time of memory system 100.

The write value $W_{IN}[303:0]$ is provided to broadcast network 120, along with the write address ADR_W[12:0] and the write control signal WR. Broadcast network 120 broadcasts the write value $W_{IN}[303:0]$, the latched write address ADR_W[12:0] and the latched write control signal WR to each of the memory banks M0-M7 of multi-bank memory core 101. As described in more detail below, this results in the write value $W_{IN}[303:0]$ being written to the memory bank identified by the write address ADR_W[12:0].

Memory controller 150 can also initiate a read access to memory system 100 by activating a read control signal RD_A and providing a read address ADR_A[12:0] to first read port P1. These read signals are latched into read port P1 input register 111 in response to the system clock signal CLK. In an alternate embodiment, read port input register 111 may be omitted, assuming that signal timing and signal integrity requirements may be met without this register. The latched read address ADR_A[12:0] and the latched read control signal RD_A are provided to broadcast network 120, which broadcasts the read address ADR_A[12:0] and the read control signal RD_A to each of the memory banks M0-M7 of multi-bank memory core 101. As described in more detail below, this results in a read value being read from the memory bank identified by the read address ADR_A[12:0].

Memory controller 150 can also initiate a read access to memory system 100 by activating a read control signal RD_B and providing a read address ADR_B[12:0] to second read port P2. These read signals are latched into read port P2 input register 112 in response to the system clock signal CLK. In an alternate embodiment, read port input register 112 may be omitted, assuming that signal timing and signal integrity requirements may be met without this register. The latched read address ADR_B[12:0] and the latched read control signal RD_B are provided to broadcast network 120, which broadcasts the read address ADR_B[12:0] and the read control signal RD_B to each of the memory banks M0-M7 of multi-bank memory core 101. As described in more detail below, this results in a read value being read from the memory bank identified by the read address ADR_B[12:0].

Memory controller 150 may simultaneously issue a write request on the write port P0, a first read request on the first read port P1, and a second read request on the second read port P2, as long as all of these access requests specify different memory banks within memory core 101. Broadcast network 120 allows all three access requests to be simultaneously provided to the selected memory banks. These simultaneous access requests are processed in parallel within the selected memory banks. Because multiple different memory banks within memory core 101 can be simultaneously accessed, the operating frequency of the memory banks M0-M7 may advantageously be slower than the operating frequency of the ports P0-P2. That is, memory core 101 may operate in response to an internal clock signal $CLK_I$ having a frequency less than the frequency of the system clock signal CLK. In one embodiment, the internal clock signal $CLK_I$ has a frequency that is half the frequency of the system clock signal CLK. As described in more detail below, memory system 100 has a fixed access latency, wherein each of the memory banks M0-M7 completes each memory access within two cycles of the system clock signal CLK. In other embodiments, the fixed access latency can be more than two cycles. It is also not essential for the read latency to have the same speed as the write latency. In certain embodiments, the read operations will operate at higher speeds than the write operations, resulting in the read latency being less than the write latency.

Memory controller 150 may also issue refresh requests directly to the individual memory banks within memory core 101. Refresh requests may be issued at the same time as write requests on write port P0 and read requests on read ports P1 and P2, as long as all of these requests specify different memory banks within memory core 101. Memory controller 150 is responsible to ensure that simultaneous access requests do not access the same memory bank. As a result, the design of memory system 100 is simplified (i.e., each of the memory banks M0-M7 has a simple memory interface).

As also described in more detail below, each of the memory banks M0-M7 implements a dedicated (distributed) control scheme, thereby facilitating the expansion of memory system 100 by the addition of memory banks. The bandwidth of memory system 100 can be increased (scaled) by increasing the number of memory banks. The number of ports can also be increased (scaled) as the bandwidth of memory system 100 increases.

Figure 2:
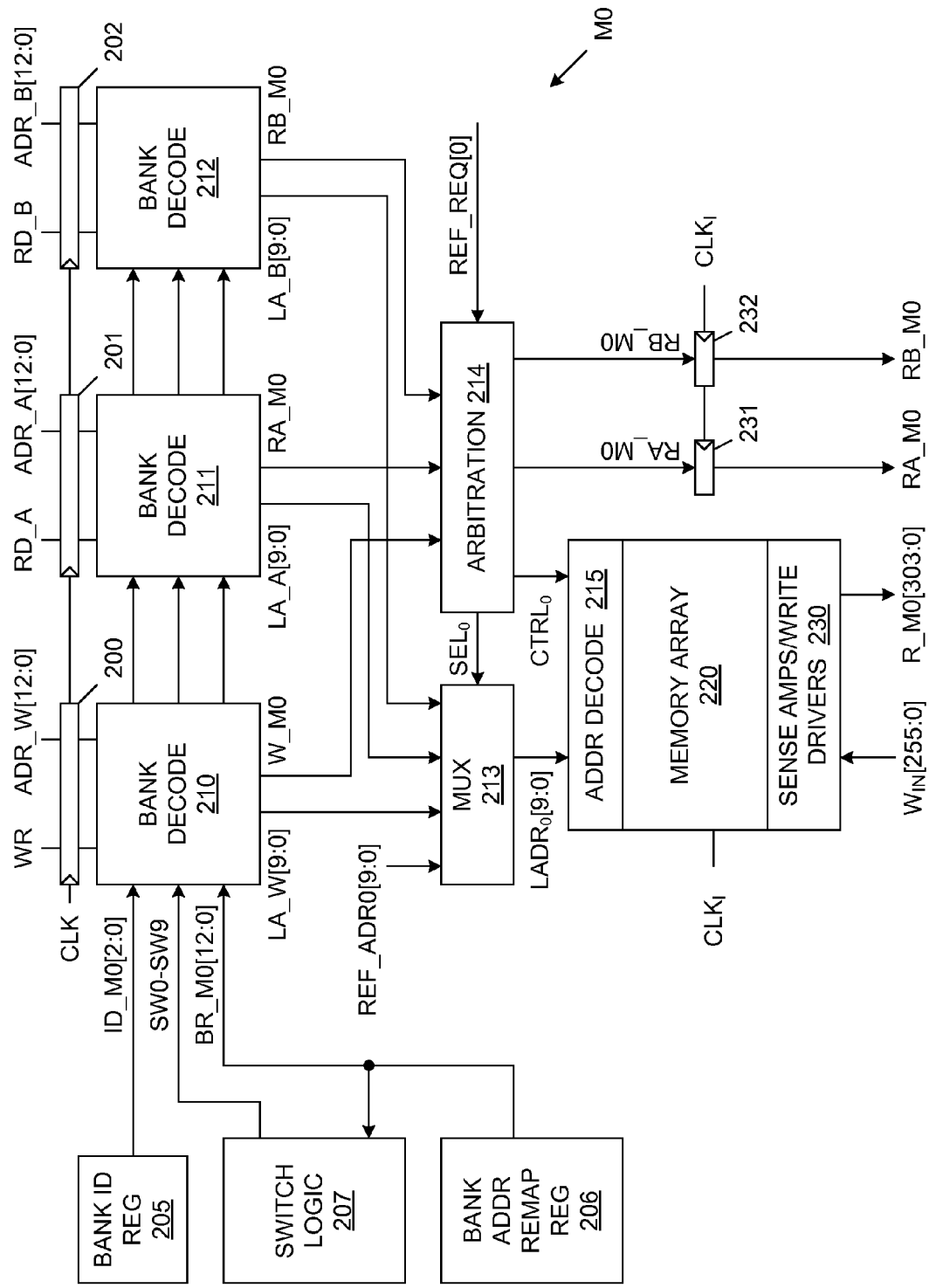
FIG. 2 is a block diagram of a memory bank of the three-port multi-bank memory system of FIG. 1 in accordance with one embodiment of the present invention.

FIG. 2 is a block diagram of memory bank M0 in accordance with one embodiment of the present invention. Memory banks M1-M7 are substantially identical to memory bank M0, with differences noted below. Memory bank M0 includes input registers 200-202, bank identification register 205, bank address re-mapping register 206, switch logic 207, bank decode logic blocks 210-211, multiplexer 213, arbitration logic 214, address decode logic 215, memory array 220, sense amplifiers/write drivers 230, and read enable output registers 231-232.

Input register 200 receives the write enable signal WR and the write address ADR_W[12:0] from write port P0 input register 110; input register 201 receives the read enable signal RD_A and the read address ADR_A[12:0] from first read port P1 input register 111; and input register 202 receives the read enable signal RD_B and the read address ADR_B[12:0] from second read port P2 input register 112. Input registers 200-202 latch the received signals in response to the system clock signal CLK. The signals stored in input registers 200-202 are provided to bank decode logic blocks 210-212, respectively.

Each of the memory banks M0-M7 is assigned a unique 3-bit bank identification value, which is stored in the corresponding bank ID register within each bank. For example, the 3-bit bank ID value ID_M0[2:0] assigned to memory bank M0 is stored in bank ID register 205. The bank ID value ID_M0[2:0] is provided to each of the bank decoder logic blocks 210-212 in the corresponding memory bank M0.

In the described examples, the 3-bit bank ID value ID_Mx[2:0] assigned to memory bank Mx is equal to the binary representation of the integer 'x', wherein x=0 to 7 inclusive. Table 1 below summarizes the bank ID values assigned to memory banks M0-M7 in the described examples.

TABLE 1

| Memory Bank | Bank ID VALUE |
| --- | --- |
| M0 | ID_M0[2:0] = 000 |
| M1 | ID_M1[2:0] = 001 |
| M2 | ID_M2[2:0] = 010 |
| M3 | ID_M3[2:0] = 011 |
| M4 | ID_M4[2:0] = 100 |
| M5 | ID_M5[2:0] = 101 |
| M6 | ID_M6[2:0] = 110 |
| M7 | ID_M7[2:0] = 111 |

Each of the memory banks M0-M7 also has a corresponding bank address re-mapping register, which stores a corresponding 13-bit bank re-mapping value. For example, bank address re-mapping register 206 stores a 13-bit bank address remapping value BR_M0[12:0] that is used within memory bank M0. The bank address re-mapping value BR_M0[12:0] is provided to each of the bank decode logic blocks 210-212 in the corresponding memory bank M0. As described in more detail below, the bank address remapping value BR_M0[12:0] identifies which three bits of the received address values (i.e., ADR_W[12:0], ADR_A[12:0] and ADR_B[12:0]) contain the bank address of the corresponding access requests. As described in more detail below, the bank address remapping values allow bank address remapping to be performed within the memory banks M0-M7, thereby allowing for performance optimization.

Each of the memory banks M0-M7 also includes corresponding switch logic, which generates a set of switching values in response to the corresponding bank address re-mapping value. For example, switch logic 207 generates switch values SW0-SW9 in response to the bank address remapping value BR_M0[12:0]. The switch values SW0-SW9 are provided to each of the bank decode logic blocks 210-212 within memory bank M0. As described in more detail below, the switch values SW0-SW9 cause the row/column address bits of the received address values ADR_W[12:0], ADR_A[12:0] and ADR_B[12:0] to be routed through the bank decode logic blocks 210-212 as the local address values LA_W[9:0], LA_A[9:0] and LA_B[9:0], respectively.

In the described examples, each of the memory banks M0-M7 operate in response to the same bank address re-mapping value and the same switch values. In these examples, a single bank address re-mapping register (e.g., register 206) may provide a single bank address remapping value (e.g., BR_M0[12:0]) to each of the memory banks M0-M7. Similarly, a single switch logic block (e.g., switch logic 207) may provide a single set of switch values (e.g., SW0-SW9) to each of the memory banks M0-M7.

Figure 3:
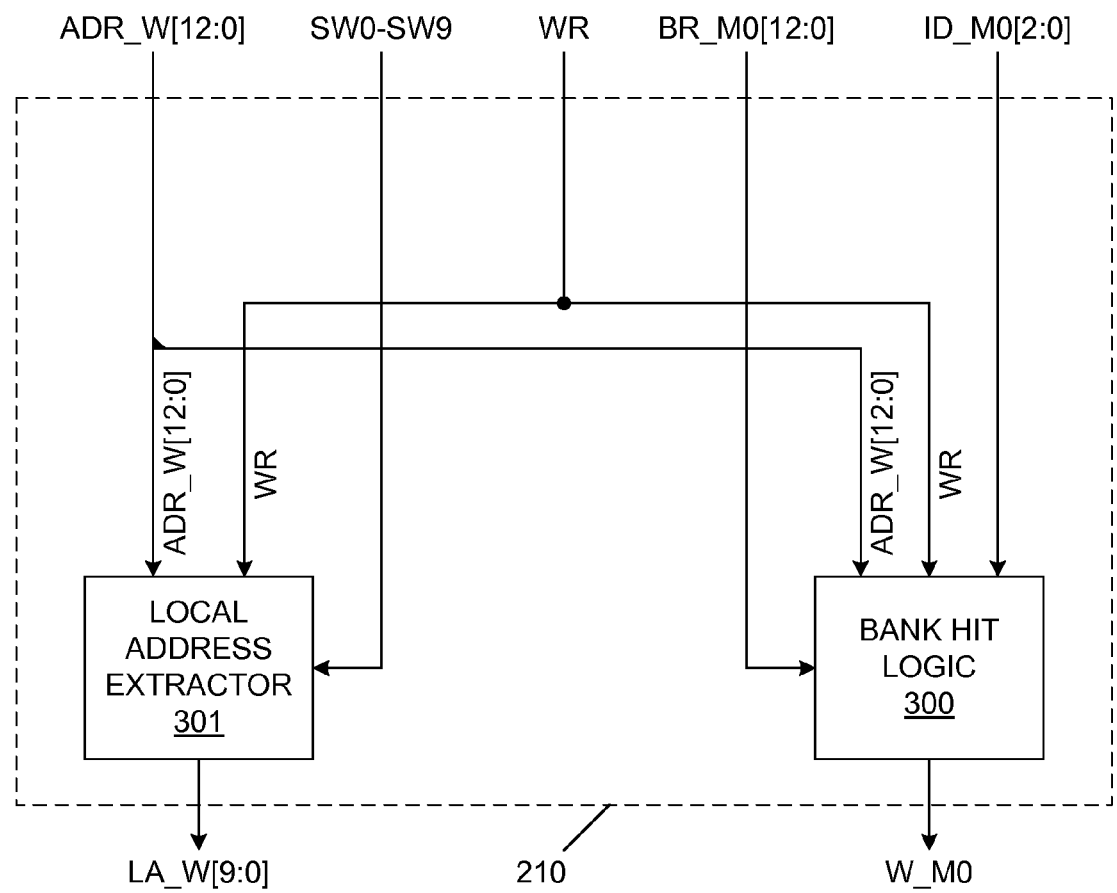
FIG. 3 is a block diagram of bank decode logic block present in the memory bank of FIG. 2 in accordance with one embodiment of the present invention.

FIG. 3 is a block diagram of bank decode logic block 210 in accordance with one embodiment of the present invention. Bank decode logic block 210 includes bank hit detection logic 300 and local address extractor logic 301. In the described embodiments, bank decode logic blocks 211 and 212 are substantially identical to bank decode logic block 210, with differences noted below.

Bank hit detection logic 300 receives the unique bank ID value ID_M0[2:0] of the associated memory bank M0, the write enable signal WR, the write address ADR_W[12:0] and the bank address remapping value BR_M0[12:0]. As described in more detail below, bank hit detection logic 300 activates a local write enable signal W_M0 upon determining that a write access to memory bank M0 is specified.

Similar bank hit detection logic blocks present in bank decode logic blocks 211 and 212 activate local read enable signals RA_M0 and RB_M0, respectively, upon determining that a read access to memory bank M0 is specified by the signals received on the first and second read ports P1 and P2, respectively.

Local address extractor 301 receives write enable signal WR, write address ADR_W[12:0] and switch values SW0-SW9. As described in more detail below, local address extractor 301 routes the bits of the write address ADR_W[12:0] that specify the row/column address of the associated write access. That is, local address extractor 301 removes the bank address portion of the write address ADR_W[12:0]. The row/column address of the write access is routed as the local write address LA_W[9:0].

Similar local address extractors present in bank decode logic blocks 211 and 212 remove the bank address portions of the read addresses ADR_A[12:0] and ADR_B[12:0], respectively, and route the row/column portions of the read addresses ADR_A[12:0] and ADR_B[12:0] as the local read addresses LA_A[9:0] and LA_B[9:0], respectively.

Figure 4:
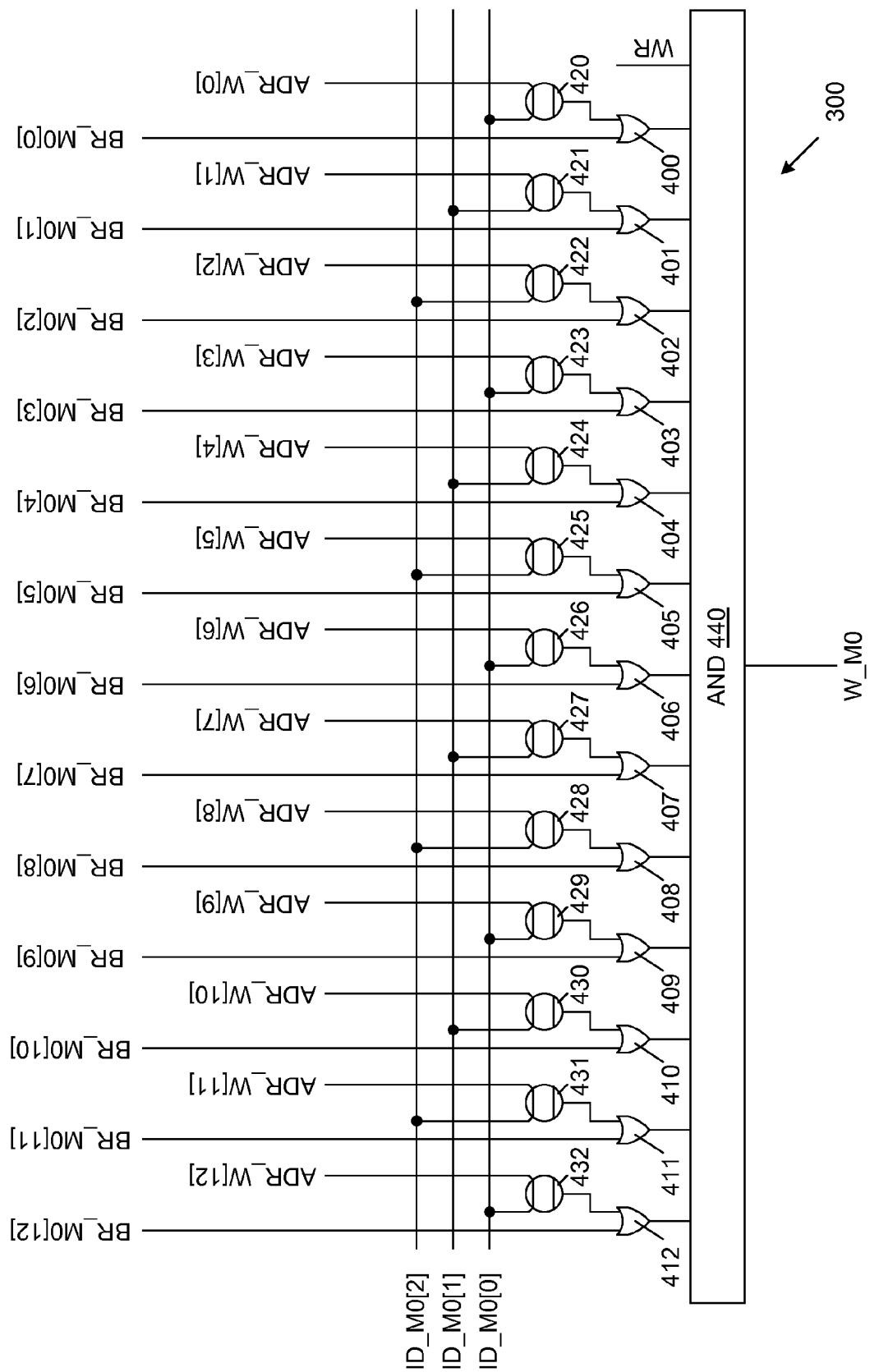
FIG. 4 is a circuit diagram of bank hit detection logic present in the bank decode logic block of FIG. 3 in accordance with one embodiment of the present invention.

FIG. 4 is a circuit diagram of bank hit detection logic 300 in accordance with one embodiment of the present invention. Bank hit detection logic 300 includes logical OR gates 400-412, comparators 420-432 and logical AND gate 440. Comparators 420-432 have input terminals coupled to receive the write address bits ADR_W[0]-ADR_W[12], respectively. Comparators 420, 423, 426, 429 and 432 also have input terminals coupled to receive the unique bank ID value ID_M0[0]. Comparators 421, 424, 427 and 430 also have input terminals coupled to receive the unique bank ID value ID_M0[1]. Comparators 422, 425, 428 and 431 also have input terminals coupled to receive the unique bank ID value ID_M0[2]. The output terminals of comparators 420-432 are coupled to input terminals of logical OR gates 400-412, respectively. Logical OR gates 400-412 also have input terminals coupled to receive the bank address remapping bits BR_M0[0]-BR_M0[12], respectively. The output terminals of logical OR gates 400-412 are coupled to input terminals of logical AND gate 440. The write enable signal WR is also provided to an input terminal of logical AND gate 440. The output terminal of logical AND gate 440 provides the local write enable signal W_M0.

Bank hit detection logic 300 operates as follows. The bank address remapping value BR_M0[12:0] indicates which three bits of the write address value ADR_W[12:0] specify the bank address of the corresponding write request. In the described example, the bank address remapping value BR_M0[12:0] includes three logic '0' bits and ten logic '1' bits, wherein the location of the three logic '0' bits correspond with the location of the bits of the bank address portion of the write address value ADR_W[12:0]. The bank address remapping value BR_M0[12:0] has a default value of '1 1111 1111 1000', which indicates that the three least significant bits of the write address value ADR_W[12:0] (i.e., ADR_W[2:0]) specify the bank address of the corresponding write request.

When the bank address remapping value BR_M0[12:0] is set to the default value, each of the logical OR gates 403-412 provides a logic '1' output signal to AND gate 440. Upon receiving a write request, the write enable signal WR is activated to a logic '1' state, and comparators 420-422 compare the write address bits ADR_W[2:0] (which represent the bank address of the corresponding write request) with the unique bank ID value ID_M0[2:0]. If the write address bits ADR_W[0], ADR_W[1] and ADR_W[2] match the bank ID bits ID_M0[0], ID_M0[1] and ID_M0[2] (i.e., ADR_W[2:0]= ID_M0[2:0]='000'), then each of comparators 420-422 will provide a logic '1' output value. Under these conditions, logical OR gates 400-402 each provide a logic '1' output value to logical AND gate 440, such that all of the signals provided to logical AND gate 440 have a logic '1' value. In response, logical AND gate 440 activates the local write enable signal W_M0 to a logic '1' state, thereby indicating that the received write request addresses the memory bank M0. If the write address bits ADR_W[2:0] do not match the corresponding bank ID bits ID_M0[2:0], then at least one of the input signals provided to logical AND gate 440 will have a logic '0' value, thereby causing logical AND gate 440 to deactivate the local write enable signal W_M0 to a logic '0' state. As described in more detail below, the connections between the bank ID bits ID_M0[2:0], the bank address remapping value BR_M0[12:0] and comparators 420-432 facilitate a bank address remapping function.

Figure 5:
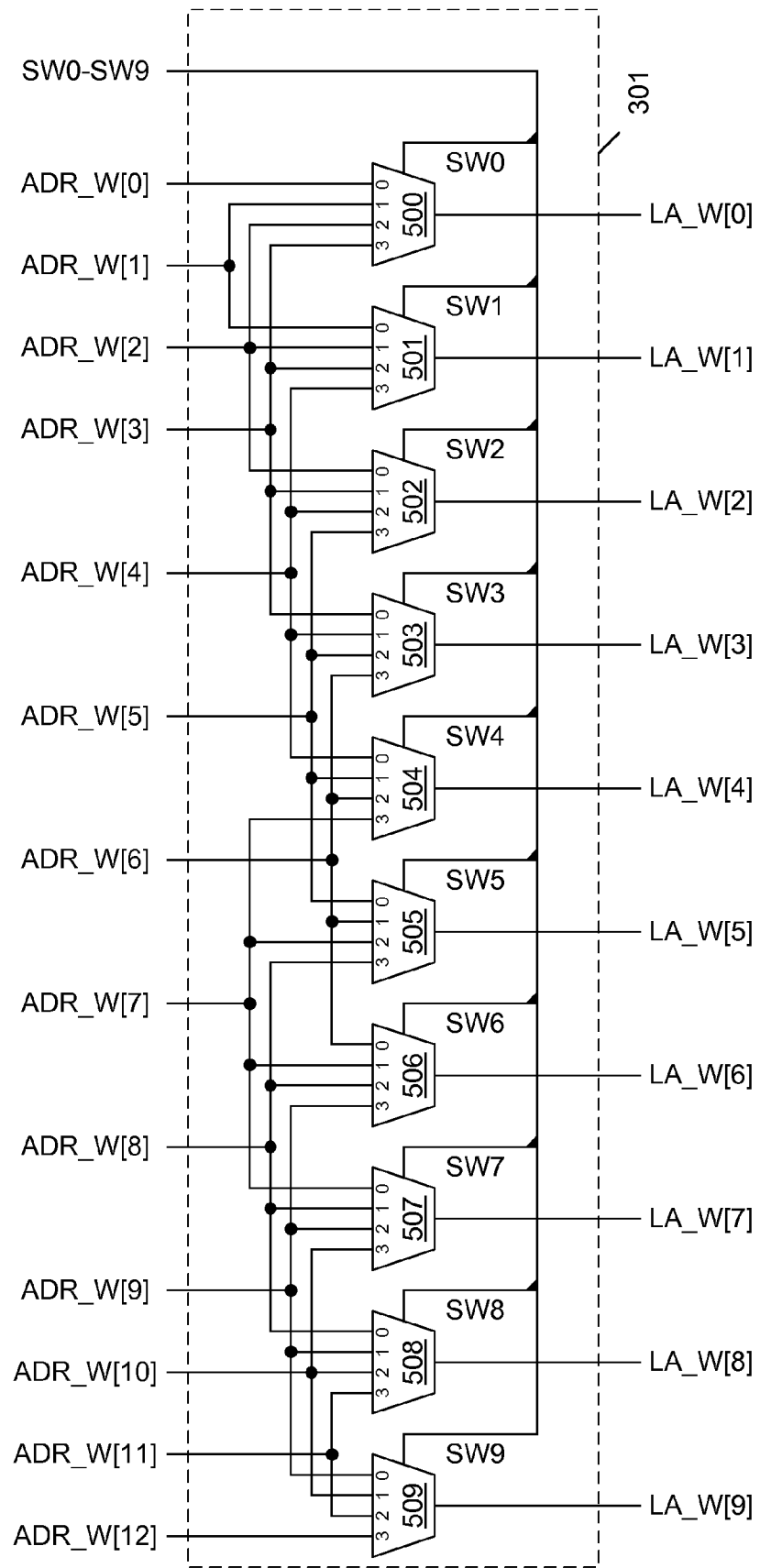
FIG. 5 is a circuit diagram of a local address extractor present in the bank decode logic block of FIG. 3 in accordance with one embodiment of the present invention.

FIG. 5 is a circuit diagram of local address extractor 301 in accordance with one embodiment of the present invention. Local address extractor 301 includes multiplexers 500-509. Each of multiplexers 500-509 includes four input terminals, which are labeled '0', '1', '2' and '3'. The '0' input terminals of multiplexers 500-509 are coupled to receive write address bits ADR_W[0]-ADR_W[9], respectively. The '1' input terminals of multiplexers 500-509 are coupled to receive write address bits ADR_W[1]-ADR_W[10], respectively. The '2' input terminals of multiplexers 500-509 are coupled to receive write address bits ADR_W[2]-ADR_W[11], respectively. The '3' input terminals of multiplexers 500-509 are coupled to receive write address bits ADR_W[3]-ADR_W[12], respectively.

Multiplexers 500-509 are controlled by the switching values SW0-SW9 provided by switch logic 207 (FIG. 2). Switch logic 207 generates the switching values SW0-SW9 in response to the bank address remapping value BR_M0[12:0]. Each of the switching values SW0-SW9 is a 2-bit value that represents the number '0', '1', '2' or '3'. Each of multiplexers 500-509 routes the write address bit received by the input terminal identified by the corresponding switching value SW0-SW9. For example, multiplexer 501 will route the write address bit ADR_W[3] received on its '2' input terminal in response to a switching value SW1 having a value of '2'. The write address bits routed by multiplexers 500-509 are labeled as local write address bits LA_W[0]-LA_W[9], respectively.

Local address extractor 301 operates as follows in accordance with one embodiment of the present invention. Switching logic 207 generates the switching values SW0-SW9 in response to the bank address remapping value BR_M0[12:0], such that multiplexers 500-509 route only the write address bits that specify the row/column address of the associated write request. In this manner, local address extractor 301 effectively extracts the local (row/column) address from the write address value ADR_W[12:0] by removing the bank address portion of this write address value.

For example, if the bank address remapping value BR_M0[12:0] has the default value of '1 1111 1111 1000' (indicating that the write address value ADR_W[12:0] has a bank address defined by ADR_W[2:0] and a row/column address defined by ADR_W[12:3]), then switching logic will generate switching logic signals SW0-SW9 that cause the write address bits ADR_W[12:3] to be routed through multiplexers 500-509 as the local write address value LA_W[9:0]. More specifically, switching logic 510 will generate switching logic signals SW0-SW9, each having a value of '3'.

As described in more detail below, the bank address remapping value BR_M0[12:0] may be modified to allow the bank hit detection logic within bank decoders 210-212 to detect bank addresses at different bit locations of the received addresses. Similarly, switch values SW0-SW9 may be modified to allow the local address extractor logic within bank decoders 210-212 to route the row/column portions of the received addresses from different bit locations of the received addresses.

Returning now to FIG. 2, bank decode logic blocks 211 and 212 generate the local read enable signals RA_M0 and RB_M0, respectively, in the same manner that bank decode logic block 210 generates the local write enable signal W_M0. Similarly, bank decode logic blocks 211 and 212 generate the corresponding local read address values LA_A[9:0] and LA_B[9:0] in the same manner that bank decode logic block 210 generates the local read address value LA_W[9:0].

The local write enable signal W_M0 and the local read enable signals RA_M0 and RB_M0 are provided to arbitration logic 214. Arbitration logic 214 also receives a dedicated refresh request signal REF_REQ[0] from memory controller 150. (In the described embodiments, memory controller 150 provides refresh request signals REF_REQ[1]-REF_REQ[7] to similar arbitration logic within memory blocks M1-M7, respectively.) The refresh request signal REF_REQ[0] is activated by memory controller 150 to initiate a refresh operation within memory bank M0. Memory controller 150 controls the write, read and refresh accesses to memory block M0 (and each of the other memory blocks M1-M7), such that only one of the signals W_M0, RA_M0, RB_M0 or REF_REQ[0] becomes active during any given cycle of the clock signal CLK.

The local write address value LA_W[9:0] and the local read address values LA_A[9:0] and LA_B[9:0] are provided to multiplexer 213. Multiplexer 213 also receives a dedicated refresh address value REF_ADR0[9:0] from memory controller 150. (In the described embodiments, memory controller 150 also provides refresh address values REF_ADR1[9:0]-REF_ADR7[9:0] similar multiplexers within memory blocks M1-M7, respectively.) Multiplexer 213 routes one of the received address values LA_W[9:0], LA_A[9:0], LA_B[9:0] or REF_ADR0[9:0] in response to a select signal $SEL_0$ generated by arbitration logic 214. Arbitration logic 214 generates the select signal $SEL_0$ such that the address value associated with an activated local enable signal is routed by multiplexer 213. For example, if the local write enable signal W_M0 is activated, then arbitration logic 214 will provide a select signal $SEL_0$ that causes multiplexer 213 to route the local write address value LA_W[9:0] to address decoder 215. The address value routed by multiplexer 213 is provided to address decoder 215 as the local address value $LADR_0$[9:0].

Arbitration logic 214 also generates a read/write control value $CTRL_0$, which is provided to address decoder 215. More specifically, arbitration logic 214 provides a read/write control value $CTRL_0$ having a first state when a write access to memory bank M0 is detected (i.e., when W_M0 is activated). Arbitration logic 214 provides a read/write control value $CTRL_0$ having a second state when a read or refresh access to memory bank M0 is detected (i.e., when RA_M0, RB_M0 or REF_REQ[0] is activated). Finally, arbitration logic 214 provides a read/write control value CTRL having a third state when no access to memory bank M0 is detected (i.e., W_M0, RA_M0, RB_M0 and REF_REQ[0] are all de-activated).

Upon receiving a read/write control value $CTRL_0$ having the first state, address decoder 215 initiates a write operation to memory array 220, wherein the write value $W_{IN}[303:0]$ is written to the row/column address of memory array 220 specified by the local address value $LADR_0[9:0]$. Note that the write value $W_{IN}[303:0]$ is provided to memory array 220 via sense amplifier/write driver circuit 230. As described above, memory array 220 has a storage capacity of 1 k words in the described example, wherein each word includes 256 data bits and 48 ECC bits.

Upon receiving a read/write control value $CTRL_0$ having the second state, address decoder 215 initiates a read access to memory array 220, wherein the word stored at the location specified by the local address value $LADR_0[9:0]$ is read from memory array 220 (via the sense amplifiers present in sense amplifier/write driver circuit 230) as the read value R_M0[303:0].

Memory array 220 operates in response to the internal clock signal $CLK_I$. In the described embodiments, write and read operations have an access latency equal to two cycles of the system clock signal CLK. That is, once a read or write request is latched into register 200-202 in response to a rising edge of the system clock signal, this request is completed two cycles (of the CLK signal) later.

Arbitration logic 214 also passes the read enable signals RA_M0 and RB_M0 to registers 231 and 232, respectively. Registers 231 and 232 latch the respective read enable signals RA_M0 and RB_M0 in response to the internal clock signal $CLK_I$. The latched read enable signals RA_M0 and RB_M0 and the read value R_M0[303:0] are routed from memory bank M0 to cross-bar network 130. Similar read values and read enable signals are routed from memory banks M1-M7 to cross-bar network 130. More specifically, memory banks M1 to M7 provide read values R_M1[303:0] to R_M7[303:0], respectively, read enable signals RA_M1 to RA_M7, respectively, and read enable signals RB_M1 to RB_M7, respectively, to cross-bar network 130.

Figure 6:
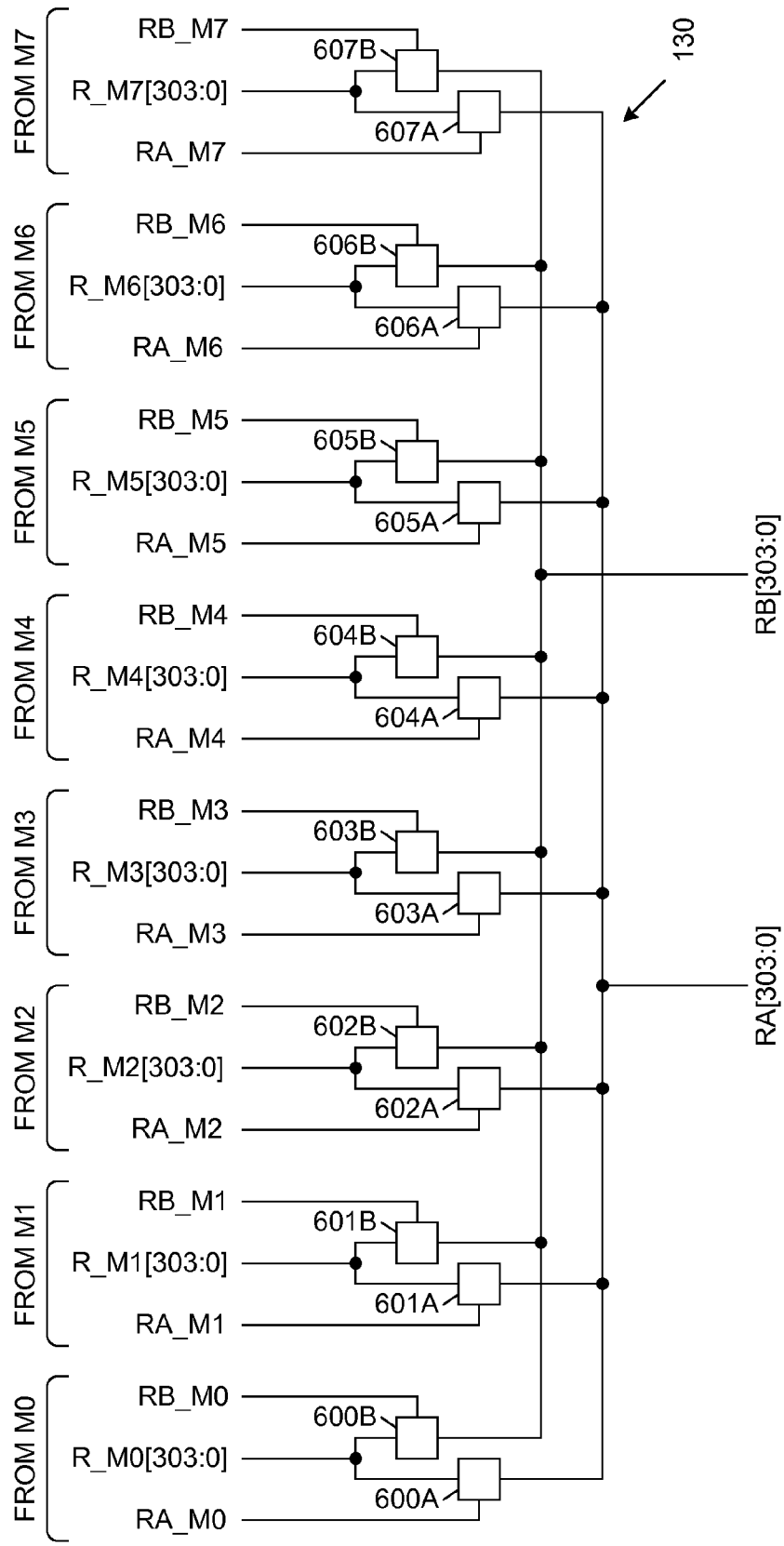
FIG. 6 is a block diagram of a cross-bar network present in the memory system of FIG. 1 in accordance with one embodiment of the present invention.

FIG. 6 is a block diagram of cross-bar network 130 in accordance with one embodiment of the present invention. Cross-bar network 130 includes switching elements 600A-607A and 600B-607B. In general, switching elements 60xA and 60xB receive the read value R_Mx[303:0] from memory bank Mx, wherein 'x' includes the integers from 0 to 7, inclusive. For example, switching elements 600A and 600B receive the read value R_M0[303:0] from memory bank M0. In general, switching elements 60xA and 60xB are controlled by the read enable signals RA_Mx and RB_Mx, respectively, from memory bank Mx. For example, switching elements 600A and 600B are controlled by the read enable signals RA_M0 and RB_M0, respectively, from memory bank M0. In one embodiment of the present invention, switching elements 600A-607A and 600B-607B are tri-state buffers that are enabled to drive the received read value when the associated read enable signal is activated. In an alternate embodiment, switching elements 600A-607A and 600B-607B are transistors that are switched on when the associated read enable signals are activated.

For example, if a read operation initiated on read port P1 accesses memory bank M0, then the read enable signal RA_M0 will be activated in the manner described above, thereby activating switching element 600A. Under these conditions, switching element 600A causes the read value R_M0[303:0] provided by memory bank M0 to be routed through cross-bar network 130 as the read output value RA[303:0]. In a similar manner, a read operation initiated on read port P2 will result in a read value being routed from the accessed memory bank as the read output value RB[303:0]. Thus, each set of switching elements 60xB-60xB operates as a de-multiplexer, which routes the read data value RMx[303:0] to the output port corresponding with the input port which originally received the associated read access request.

Although cross-bar network 130 has been described as an element separate from memory banks M0-M7, it is understood that the above described switching elements 600A-607A and 600B-607B of cross-bar network 130 may be logically included within their corresponding memory banks M0-M7 in an alternate embodiment. For example, switching elements 600A and 600B may be located within memory bank M0, switching elements 601A and 601B may be located within memory bank M1, etc.

As described above, an activated refresh request signal (e.g., REF_REQ[0]) will result in a read operation being performed within the corresponding memory bank (e.g., memory bank M0). However, the read value resulting from this read operation is not transmitted through cross-bar network 130 because the read enable signals associated with this memory bank (e.g., RA_M0 and RB_M0) are not activated in response to the activated refresh request signal.

The read output values RA[303:0] and RB[303:0] are provided to ECC correction circuits 131 and 132, respectively. ECC correction circuits 131 and 132 perform any necessary error correction on the received read output values RA[303:0] and RB[303:0], thereby creating the corrected read output data values DA[255:0] and DA[255:0], respectively. The read output data values DA[255:0] and DB[255:0] are latched into output registers 141 and 142, respectively, in response to the system clock signal CLK. The contents of output registers 141 and 142 are provided to memory controller 150 as the read output data values $D_{OUTA}[255:0]$ and $D_{OUTB}[255:0]$, respectively. Providing an ECC correction circuit for each read port (rather than each memory bank) advantageously reduces the layout area and cycle time of memory system 100.

The above-described broadcast network 120 and cross-bar switch 130 enable multiple banks within memory core 101 to be concurrently accessed. For example, a write operation initiated on the write port P0 during a first cycle of the system clock signal CLK may be performed to a first memory bank within memory core 101. At the same time, a read operation initiated on the read port P1 during the first cycle of the system clock signal CLK may be performed to a second (different) memory bank within memory core 101. A read operation initiated on the read port P2 during the first cycle of the system clock signal CLK may be concurrently performed to a third (different) memory bank within memory core 101. At the same time, refresh operations can be concurrently performed within any (or all) of the memory banks that are not accessed by ports P0-P2. Because memory banks M0-M7 can be concurrently accessed, these memory banks M0-M7 may operate a lower frequency than the ports P0-P2, while maintaining the bandwidth specified at the ports P0-P2.

In accordance with one embodiment of the present invention, memory controller 150 coordinates and controls all accesses to memory system 100, including write operations, read operations and refresh operations. As described above, memory controller 150 should ensure that concurrent access requests address different memory banks within the memory core 101.

In accordance with one embodiment of the present invention, the performance of memory system 100 is scalable. That is, the bandwidth of memory system 100 can be increased by increasing the number of ports and the number of memory banks present in memory core 101. Advantageously, the architecture of memory system 100 is very simple, as the memory controller 150 is relied on to handle operating complexities. The memory controller 150 can therefore optimize the performance and power of memory system 100.

A bank address re-mapping example in accordance with one embodiment of the present invention will now be described. In this example, memory controller 150 includes a computing engine that operates at 500 MHz (i.e., the frequency of the system clock signal CLK is 500 MHz). The computing engine can initiate two read operations and one write operation during each cycle of the system clock signal CLK. Each read and write operation has an access latency of two cycles of the system clock signal. That is, each of the memory banks M0-M7 has a fixed latency equal to two cycles of the system clock signal CLK. The cycle time for each of the memory banks M0-M7 is 250 MHz. The memory banks M0-M7 must be refreshed, and each refresh operation requires two cycles of the system clock signal CLK. The computing engine can also initiate a computation during each cycle of the system clock signal CLK, wherein each computation requires one cycle of the system clock signal CLK to complete.

Initially, each of the memory blocks M0-M7 is configured in response to the default bank address remapping value (e.g., BR_M0[12:0]='1 1111 1111 1000' and SW9-SW0='33 3333 3333'). As a result, memory banks are mapped to the address spaces specified below in Table 2. Stated another way, the three least significant bits of the write address value ADR_W[12:0], the read address value ADR_A[12:0], the read address value ADR_B[12:0] define the bank address of the associated access request.

TABLE 2

| Memory Bank | Address Space |
|---|---|
| M0 | (adr[12:3], 3b'000} |
| M1 | (adr[12:3], 3b'001} |
| M2 | (adr[12:3], 3b'010} |
| M3 | (adr[12:3], 3b'011} |
| M4 | (adr[12:3], 3b'100} |
| M5 | (adr[12:3], 3b'101} |
| M6 | (adr[12:3], 3b'110} |
| M7 | (adr[12:3], 3b'111} |

Assume that the computing engine is to perform the following computation:

```
For(i=0; i < 2k; i++) {
    mem(4k+i) = mem(2k+i) + mem(i);
}
```
computation (1)

The computing engine may implement computation (1) in the manner defined by Table 3 below, wherein each row of the table represents one cycle of the system clock signal CLK.

TABLE 3

| Cycle | Read (P1) | Read (P2) | Comp | Write (P0) | Ref Bank |
|---|---|---|---|---|---|
| 1 | Mem(0) M0 | — | — | — | M1-M7 |
| 2 | Mem(1) M1 | — | — | — | M2-M7 |
| 3 | Mem(2) M2 | Mem(2k) M0 | — | — | M3, M4 M5, M6 M7 |
| 4 | Mem(3) M3 | Mem(2k + 1) M1 | — | — | M4, M5 M5, M7 |
| 5 | Mem(4) M4 | Mem(2k + 2) M2 | — | — | M0, M5 M6, M7 |
| 6 | Mem(5) M5 | Mem(2k + 3) M3 | Mem(0) + Mem(2k) = Sum0 | — | M0, M1 M6, M7 |
| 7 | Mem(6) M6 | Mem(2k + 4) M4 | Mem(1) + Mem(2k + 1) = Sum1 | Sum0 to Mem(4k) M0 | M1, M2 M7 |
| 8 | Mem(7) M7 | Mem(2k + 5) M5 | Mem(2) + Mem(2k + 2) = Sum2 | Sum1 to Mem(4k + 1) M1 | M2, M3 |
| 9 | Mem(8) M0 | Mem(2k + 6) M6 | Mem(3) + Mem(2k + 3) = Sum3 | Sum2 to Mem(4k + 2) M2 | M3, M4 |
| 10 | Mem(9) M1 | Mem(2k + 7) M7 | Mem(4) + Mem(2k + 4) = Sum4 | Sum3 to Mem(4k + 3) M3 | M4, M5 |
| 11 | Mem(10) M2 | Mem(2k + 8) M0 | Mem(5) + Mem(2k + 5) = Sum5 | Sum4 to Mem(4k + 4) M4 | M5, M6 |
| 12 | Mem(11) M3 | Mem(2k + 9) M1 | Mem(6) + Mem(2k + 6) = Sum6 | Sum5 to Mem(4k + 5) M5 | M6, M7 |
| 13 | Mem(12) M4 | Mem(2k + 10) M2 | Mem(7) + Mem(2k + 7) = Sum7 | Sum6 to Mem(4k + 6) M6 | M7, M0 |

TABLE 3-continued

| Cycle | Read (P1) | Read (P2) | Comp | Write (P0) | Ref Bank |
|---|---|---|---|---|---|
| 14 | Mem(13) M5 | Mem(2k + 11) M3 | Mem(8) + Mem(2k + 8) = Sum8 | Sum7 to Mem(4k + 7) M7 | M0, M1 |
| 15 | Mem(14) M6 | Mem(2k + 12) M4 | Mem(9) + Mem(2k + 9) = Sum9 | Sum8 to Mem(4k + 8) MB0 | M1, M2 |
| 16 | Mem(15) M7 | Mem(2k + 13) M5 | Mem(10) + Mem(2k + 10) = Sum10 | Sum9 to Mem(4k + 9) M1 | M2, M3 |

During the first clock cycle (cycle 1), the computing engine initiates a read operation on the first read port P1 to memory address '0 0000 0000 0000' (i.e., mem(0)). This read operation, which accesses memory bank M0, is complete after two cycles of the system clock signal CLK (i.e., by the start of cycle 3).

During the next clock cycle (cycle 2), a read operation is initiated on the second read port P2 to memory address '0 0000 0000 0001' (i.e., mem(1)). This read operation, which accesses memory bank M1, is complete by the start of cycle 4).

During the third clock cycle (cycle 3), a read operation is initiated on the first read port P1 to memory address '0 0000 0000 0010' (i.e., mem(2)), and another read operation is simultaneously initiated on the second read port P2 to memory address '0 1000 0000 0000' (i.e., mem(2 k)). These read operations, which access memory banks M2 and M0, respectively, are complete by the start of cycle 5.

During the sixth clock cycle (cycle 6), the computing engine adds the data values read from memory addresses mem(0) and mem(2 k), thereby creating a sum value, Sum0. During the seventh clock cycle (cycle 7), the computing engine initiates a write operation on the write port P0, whereby the sum value Sum0 calculated during the sixth clock cycle is written to memory address '1 0000 0000 0000' (i.e., mem(4 k)). This write operation, which is complete by the start of cycle 8, accesses memory bank M0.

As illustrated by Table 3, the computing engine issues read requests to the first read port P1 during each cycle, with the memory address starting at 0, and being incremented by 1 during each cycle. Thus, the computing engine receives a steady stream of read data values from the first read port P1 (starting at cycle 3).

Similarly, the computing engine issues read requests to the second read port P2 during each cycle (starting during cycle 3), with the memory address starting at 2 k and being incremented by 1 during each cycle. Thus, the computing engine receives a steady stream of read data values from the second read port P2 (starting at cycle 6).

Finally, the computing engine issues write requests to the write port P0 during each cycle (starting during cycle 7), with the memory address starting at 4 k and being incremented by 1 during each cycle.

By performing the read requests and write requests in this order, the write accesses initiated on the write port P0 and the read accesses initiated on the read ports P1 and P2 never access the same memory bank during the same cycle. Starting with cycle 8, two of the eight memory banks are available for refresh during each cycle. For example, during cycle 8, memory banks M2 and M3 are available for refresh. That is, memory banks M2 and M3 are the only memory banks that are not being accessed by the various read and write operations during cycle 8. Note that during cycle 8, memory bank M0 is busy performing a write operation to mem(4 k), memory bank M1 is busy performing a write operation to mem(4 k+1), memory bank M4 performing a read from mem (2k+4), memory bank M5 is busy performing a read from mem(2k+5), memory bank M6 is busy performing a read from mem(6) and memory bank M7 is busy performing a read from mem(7). The memory banks available for refresh change each cycle, such that each of the memory banks is periodically available for refresh. As a result, the access pattern defined by Table 3 is sustainable.

Next, assume that the computing engine is to perform the following computation, again assuming that each of the memory blocks M0-M7 is configured in response to the default bank address remapping value.

For(i=0; i < 4k; i=i+2) {
  mem(4k+i) = mem(i) + mem(2k+i);
}                                      computation (2)

The computing engine may attempt implement computation (2) in the manner defined by Table 4 below, wherein each row of the table represents one cycle of the system clock signal CLK.

TABLE 4

| Cycle | Read (P1) | Read (P2) | Comp | Write (P0) | Ref Bank |
|---|---|---|---|---|---|
| 1 | Mem(0) M0 | — | — | — | M1-M7 |
| 2 | Mem(2) M2 | — | — | — | M1 M3-M7 |
| 3 | Mem(4) M4 | Mem(2k) M0 | — | — | M1, M3 M5-M7 |
| 4 | Mem(6) M6 | Mem(2k + 2) M2 | — | — | M1, M3 M5, M7 |
| 5 | Mem(8) M0 | Mem(2k + 4) M4 | — | — | M1, M3 M5, M7 |

TABLE 4-continued

| Cycle | Read (P1) | Read (P2) | Comp | Write (P0) | Ref Bank |
|---|---|---|---|---|---|
| 6 | Mem(10) M2 | Mem(2k + 6) M6 | Mem(0) + Mem(2k) = Sum0 | — | M1, M3 M5, M7 |
| 7 | Mem(12) M4 | Mem(2k + 8) M0 | Mem(2) + Mem(2k + 2) = Sum2 | Sum0 to Mem(4k) M0 | M1, M3 M5, M7 |
| 8 | Mem(14) M6 | Mem(2k + 10) M2 | Mem(4) + Mem(2k + 4) = Sum4 | Sum2 to Mem(4k + 2) M2 | M1, M3 M5, M7 |
| 9 | Mem(16) M0 | Mem(2k + 12) M4 | Mem(6) + Mem(2k + 6) = Sum6 | Sum4 to Mem(4k + 4) M4 | M1, M3 M5, M7 |
| 10 | Mem(18) M2 | Mem(2k + 14) M6 | Mem(8) + Mem(2k + 8) = Sum8 | Sum6 to Mem(4k + 6) M6 | M1, M3 M5, M7 |
| 11 | Mem(20) M4 | Mem(2k + 16) M0 | Mem(10) + Mem(2k + 10) = Sum10 | Sum8 to Mem(4k + 8) M0 | M1, M3 M5, M7 |
| 12 | Mem(22) M6 | Mem(2k + 18) M2 | Mem(12) + Mem(2k + 12) = Sum12 | Sum10 to Mem(4k + 10) M2 | M1, M3 M5, M7 |
| 13 | Mem(24) M0 | Mem(2k + 20) M4 | Mem(14) + Mem(2k + 14) = Sum14 | Sum12 to Mem(4k + 12) M4 | M1, M3 M5, M7 |
| 14 | Mem(26) M2 | Mem(2k + 22) M6 | Mem(16) + Mem(2k + 16) = Sum16 | Sum14 to Mem(4k + 14) M6 | M1, M3 M5, M7 |
| 15 | Mem(28) M4 | Mem(2k + 24) M0 | Mem(18) + Mem(2k + 18) = Sum18 | Sum16 to Mem(4k + 16) M0 | M1, M3 M5, M7 |
| 16 | Mem(30) M6 | Mem(2k + 26) M2 | Mem(20) + Mem(2k + 20) = Sum20 | Sum18 to Mem(4k + 18) M2 | M1, M3 M5, M7 |

However, Table 4 illustrates several issues that would prevent the computing engine from efficiently implementing computation (2) using the default bank address remapping value. First, the computing engine would have to stall the pipeline for each write operation due to bank conflicts. For example, the computing engine could not write the sum value Sum0 to memory location mem(4 k) during cycle 7, because memory location mem(4 k) exists within memory bank M0, and memory bank M0 is already being accessed during cycle 7 by read operation to memory location mem(2k+8).

In addition, memory banks M0, M2, M4 and M6 are accessed during each cycle, starting at cycle 4. As a result, only memory banks M1, M3, M5 and M7 are available for refresh starting from cycle 4. Thus, the computing engine may need to stall the computation pipeline to allow refresh operations to be performed to memory banks M0, M2, M4 and M6.

However, the bank address remapping value BR_M0[12:0] can be modified from the default value to eliminate the above described issues, thereby allowing the computing engine to efficiently implement computation (2) using memory system 100. In accordance with one embodiment of the present invention, the bank address remapping value BR_M0[12:0] is modified to have a value of '1 1111 1111 0001' in order to allow the computing engine to implement computation (2). Under these conditions, memory banks M0-M7 are re-mapped to the address spaces specified below in Table 5. Stated another way, bits [3:1] of the write address value ADR_W[12:0], the read address value ADR_A[12:0], the read address value ADR_B[12:0] define the bank address of the associated access request.

TABLE 5

| Memory Bank | Address Space |
|---|---|
| M0 | (adr[12:4], 3b'000, adr[0]} |
| M1 | (adr[12:4], 3b'100, adr[0]} |
| M2 | (adr[12:4], 3b'001, adr[0]} |
| M3 | (adr[12:4], 3b'101, adr[0]} |
| M4 | (adr[12:4], 3b'010, adr[0]} |
| M5 | (adr[12:4], 3b'110, adr[0]} |
| M6 | (adr[12:4], 3b'011, adr[0]} |
| M7 | (adr[12:4], 3b'111, adr[0]} |

Note that the circuitry of the bank hit detection logic 300 (FIG. 4) causes a translation of the bank addresses for memory banks M1-M6. For example, a bank address of '001' using the default bank address remapping value would specify memory bank M1, while a bank address of '001' in the present example will specify memory bank M2.

In the present example, the switch logic 207 generates a new set of switch values SW0-SW9 in response to the modified bank address remapping value. More specifically, switch logic 207 (FIG. 2) generates a set of switch values SW0-SW9 having values of '0,3,3,3,3,3,3,3,3,3', respectively. As a result, local address extractor 301 (FIG. 4) within memory bank M0 will route the write address values ADR_W[12:4] and ADR_W[0] as the local write address LA_W[9:0]. The local address extractors present in bank decode logic blocks 211 and 212 of memory bank M0 route the respective read address values ADR_A[12:4], ADR_A[0] and ADR_B[12:4], ADR_B[0] as the respective local read address values LA-A[9:0] and LA-B[9:0] in the same manner. The other memory banks M1-M7 route the corresponding write and read addresses in the same manner as memory bank M0.

Given the modified bank address re-mapping value specified above, the computing engine may implement computation (2) in the manner defined by Table 6 below, wherein each row of the table represents one cycle of the system clock signal CLK.

$741_0$ to $741_M$. Multi-bank memory core 701 includes (N+1) memory banks $M_0$ to $M_N$. Memory system 700 operates in response to memory controller 750.

TABLE 6

| Cycle | Read (P1) | Read (P2) | Comp | Write (P0) | Ref Bank |
|---|---|---|---|---|---|
| 1 | Mem(0) M0 | — | — | — | M1-M7 |
| 2 | Mem(2) M2 | — | — | — | M1 M3-M7 |
| 3 | Mem(4) M4 | Mem(2k) M0 | — | — | M1, M3 M5-M7 |
| 4 | Mem(6) M6 | Mem(2k + 2) M2 | — | — | M1, M3 M5, M7 |
| 5 | Mem(8) M1 | Mem(2k + 4) M4 | — | — | M0, M3 M5, M7 |
| 6 | Mem(10) M3 | Mem(2k + 6) M6 | Mem(0) + Mem(2k) = Sum0 | — | M0, M2 M5, M7 |
| 7 | Mem(12) M5 | Mem(2k + 8) M1 | Mem(2) + Mem(2k + 2) = Sum2 | Sum0 to Mem(4k) M0 | M2, M4 M7 |
| 8 | Mem(14) M7 | Mem(2k + 10) M3 | Mem(4) + Mem(2k + 4) = Sum4 | Sum2 to Mem(4k + 2) M2 | M4, M6 |
| 9 | Mem(16) M0 | Mem(2k + 12) M5 | Mem(6) + Mem(2k + 6) = Sum6 | Sum4 to Mem(4k + 4) M4 | M1, M6 |
| 10 | Mem(18) M2 | Mem(2k + 14) M7 | Mem(8) + Mem(2k + 8) = Sum8 | Sum6 to Mem(4k + 6) M6 | M1, M3 |
| 11 | Mem(20) M4 | Mem(2k + 16) M0 | Mem(10) + Mem(2k + 10) = Sum10 | Sum8 to Mem(4k + 8) M1 | M3, M5 |
| 12 | Mem(22) M6 | Mem(2k + 18) M2 | Mem(12) + Mem(2k + 12) = Sum12 | Sum10 to Mem(4k + 10) M3 | M5, M7 |
| 13 | Mem(24) M1 | Mem(2k + 20) M4 | Mem(14) + Mem(2k + 14) = Sum14 | Sum12 to Mem(4k + 12) M5 | M0, M7 |
| 14 | Mem(26) M3 | Mem(2k + 22) M6 | Mem(16) + Mem(2k + 16) = Sum16 | Sum14 to Mem(4k + 14) M7 | M0, M2 |
| 15 | Mem(28) M5 | Mem(2k + 24) M1 | Mem(18) + Mem(2k + 18) = Sum18 | Sum16 to Mem(4k + 16) M0 | M2, M4 |
| 16 | Mem(30) M7 | Mem(2k + 26) M3 | Mem(20) + Mem(2k + 20) = Sum20 | Sum18 to Mem(4k + 18) M2 | M4, M6 |

As illustrated in Table 6, the issues illustrated by Table 4 have been eliminated by the bank address re-mapping. More specifically, the computing engine does not need to stall the computation pipeline for each write operation due to bank conflicts. For example, the computing engine may write the sum value Sum0 to memory location mem(4 k) during cycle 7, because memory location mem(4 k) exists within memory bank M0, and memory bank M0 is not being accessed by any other operation during cycle 7.

In addition, each of the memory banks M0-M7 periodically becomes available for refresh, such that the access pattern is sustainable. Although one example of bank address re-mapping has been described, it is understood that the structures of bank hit detection logic 301 and local address extractor 302 allow for many other bank address re-mapping schemes.

Figure 7:
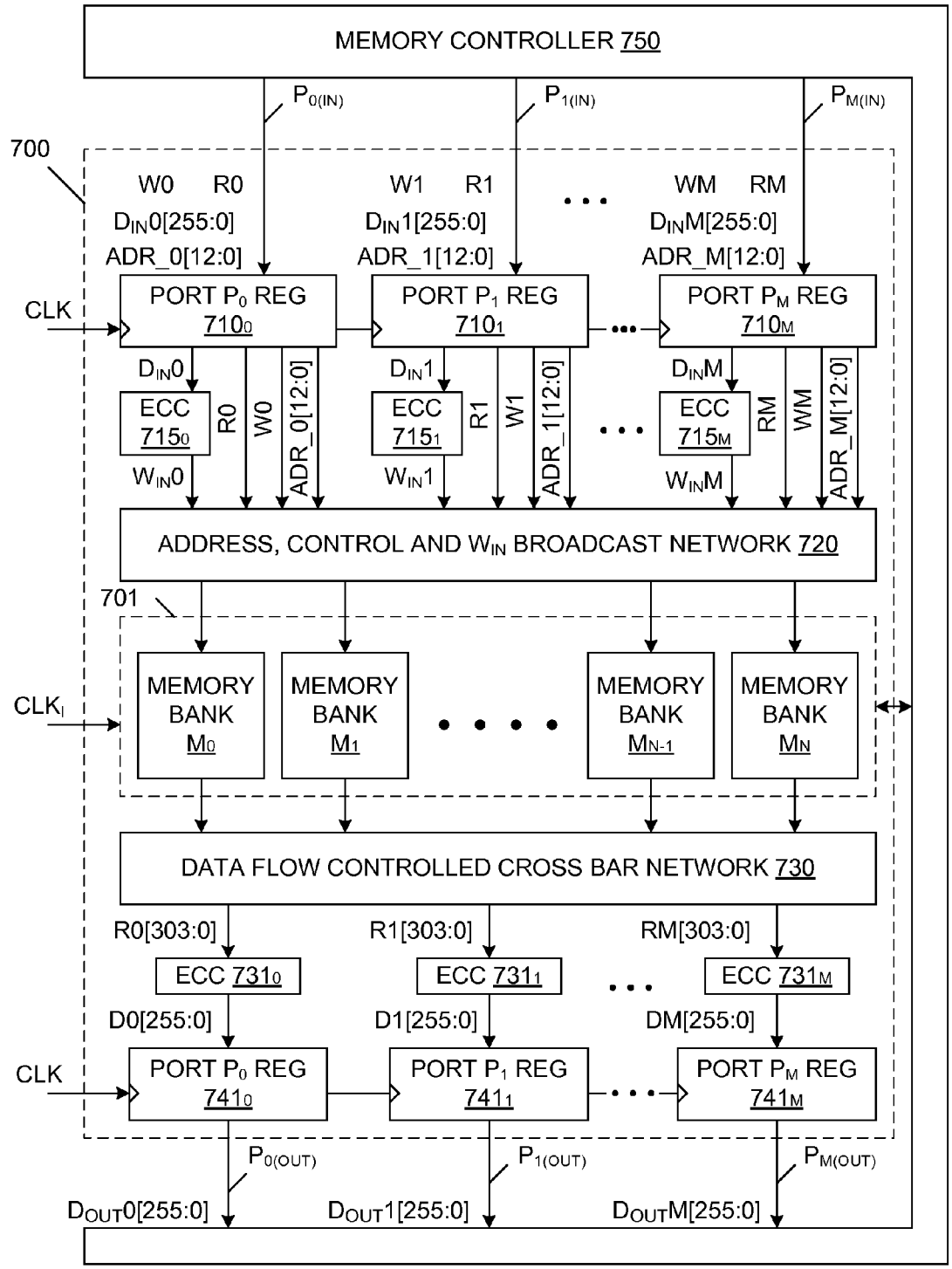
FIG. 7 is a block diagram of a multi-port multi-bank memory system in accordance with another embodiment of the present invention.

FIG. 7 is a block diagram of a memory system 700 in accordance with another embodiment of the present invention, which includes (M+1) ports $P_0$ to $P_M$, input port registers $710_0$ to $710_M$, multi-bank memory core 701, ECC generators $715_0$ to $715_M$, broadcast network 720, cross-bar network 730, ECC correction blocks $731_0$ to $731_M$ and port output registers Memory system 700 is similar to memory system 100 (FIGS. 1-6). However, memory system 700 is expanded to include M+1 ports and N+1 memory banks. In addition, each of the ports $P_0$ to $P_M$ may be used to initiate both read and write accesses to the multi-bank memory core 701. Thus, ports $P_0$ to $P_M$ receive read enable signals R0 to RM, respectively, write enable signals W0 to WM, respectively, write data values $D_{IN}0[255:0]$ to $D_{IN}M[255:0]$, respectively, and address values ADR_0[12:0] to ADR_M[12:0], respectively, from memory controller 750. Read data values $D_{OUT}0[255:0]$ to $D_{OUT}M[255:0]$ are provided on ports $P_0$ to $P_M$, respectively.

In order to provide consistency in the description of memory systems 100 and 700, it is assumed that N is equal to seven in the examples described herein, such that memory system 700 includes eight memory banks $M_0$-$M_7$. It is further assumed that each of these memory banks has a capacity of 1k words, such that a 13-bit address field is appropriate.

To initiate a read access from port Px, memory controller 750 activates the corresponding read enable signal Rx, and provides the corresponding read address ADR_x. This read enable signal Rx and read address ADR_x are provided to broadcast network 720, which broadcasts these signals to each of the memory banks $M_0$ to $M_N$. The memory banks decode the read address ADR_x in a manner similar to that described above in connection with FIGS. 2-5. A read operation is then performed in the memory bank specified by the address ADR_x, and the associated read value is provided to cross-bar network 730. This memory bank also activates a read enable signal that identifies the accessing port Px, in a manner similar to that described above in connection with FIGS. 2-3, and transmits this read enable signal to cross-bar network 730. In response, cross-bar network 730 routes the associated read value to ECC correction block 731x as the read value Rx. This ECC correction block 731x performs any necessary error correction, and provides a corrected data value Dx to the corresponding port output register 741x. This corrected data value Dx is latched into the port output register 741x in response to the system clock signal CLK, and is provided to memory controller 750 as the port Px output data value $D_{OUT}x$.

To initiate a write access to port Px, memory controller 750 activates the corresponding write enable signal Wx, and provides the corresponding write address ADR_x and write data value $D_{IN}x$ to port Px. The activated write enable signal Wx activates the corresponding ECC generator 715x, thereby causing this ECC generator 715x to generate the write value $W_{IN}x$ in response to the write data value $D_{IN}x$. This write value $W_{IN}x$, the write enable signal Wx and the write address ADR_x are provided to broadcast network 720, which broadcasts these signals to each of the memory banks $M_0$ to $M_N$. The memory banks decode the write address ADR_x and the write enable signal Wx in a manner similar to that described above in connection with FIGS. 2-5. A write operation is then performed in the memory bank specified by the write address ADR_x.

Memory controller 750 operates in the same manner as memory controller 150. That is, memory controller 750 may enable concurrent accesses on ports $P_0$ to $P_M$, as long as none of these concurrent accesses address the same memory banks within memory core 701. Memory controller 750 also controls the required refresh operations to memory banks $M_0$-$M_N$.

Figure 8:
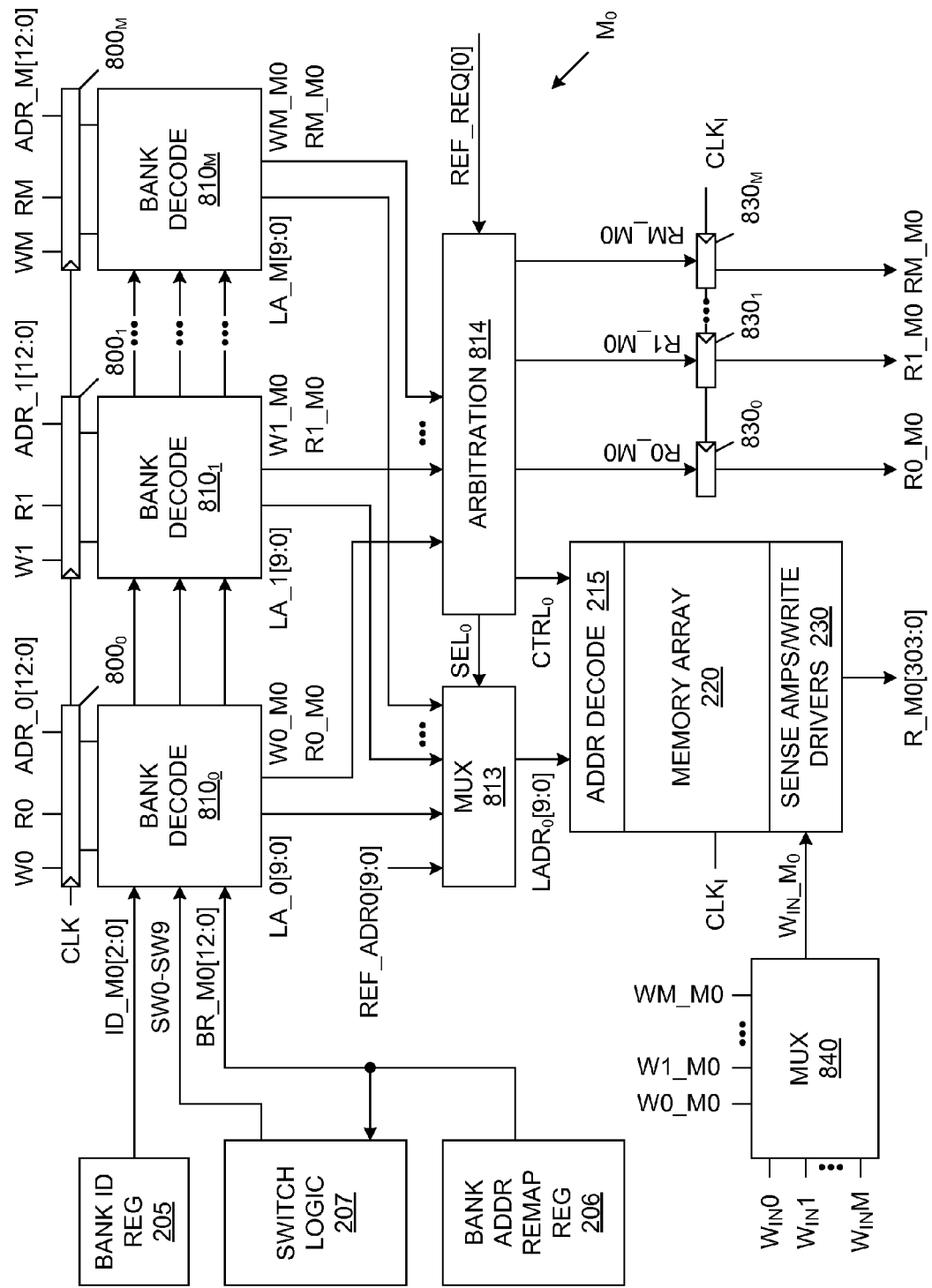
FIG. 8 is a block diagram of a memory bank of the multi-port multi-bank memory system of FIG. 7 in accordance with one embodiment of the present invention.

FIG. 8 is a block diagram of memory bank $M_0$ in accordance with one embodiment of the present invention. Memory banks $M_1$-$M_N$ are substantially identical to memory bank $M_0$, with differences noted below. Memory bank $M_0$ is also similar to memory bank M0, which has been described above in connection with FIGS. 2-5. Thus, similar elements in FIGS. 2 and 8 are labeled with similar reference numbers.

Memory bank $M_0$ includes input registers $800_0$-$800_M$, bank identification register 205, bank address re-mapping register 206, switch logic 207, bank decode logic blocks $810_0$-$810_M$, multiplexer 213, arbitration logic 814, address decode logic 215, memory array 220, sense amplifiers/write drivers 230, read enable output registers $831_0$-$831_M$, and multiplexer 840.

Input registers $800_0$-$800_M$ latch the corresponding read control signals R0-RM, the corresponding write control signals W0-WM and the corresponding address values ADR_0-ADR_M, provided through broadcast network 720. The contents of input registers $800_0$-$800_M$ are provided to bank decoder logic blocks $810_0$-$810_M$, respectively. Bank decoder logic blocks $810_0$-$810_M$ are substantially identical (and are similar to bank decoder logic blocks 210-212 of FIG. 2).

Figure 9:
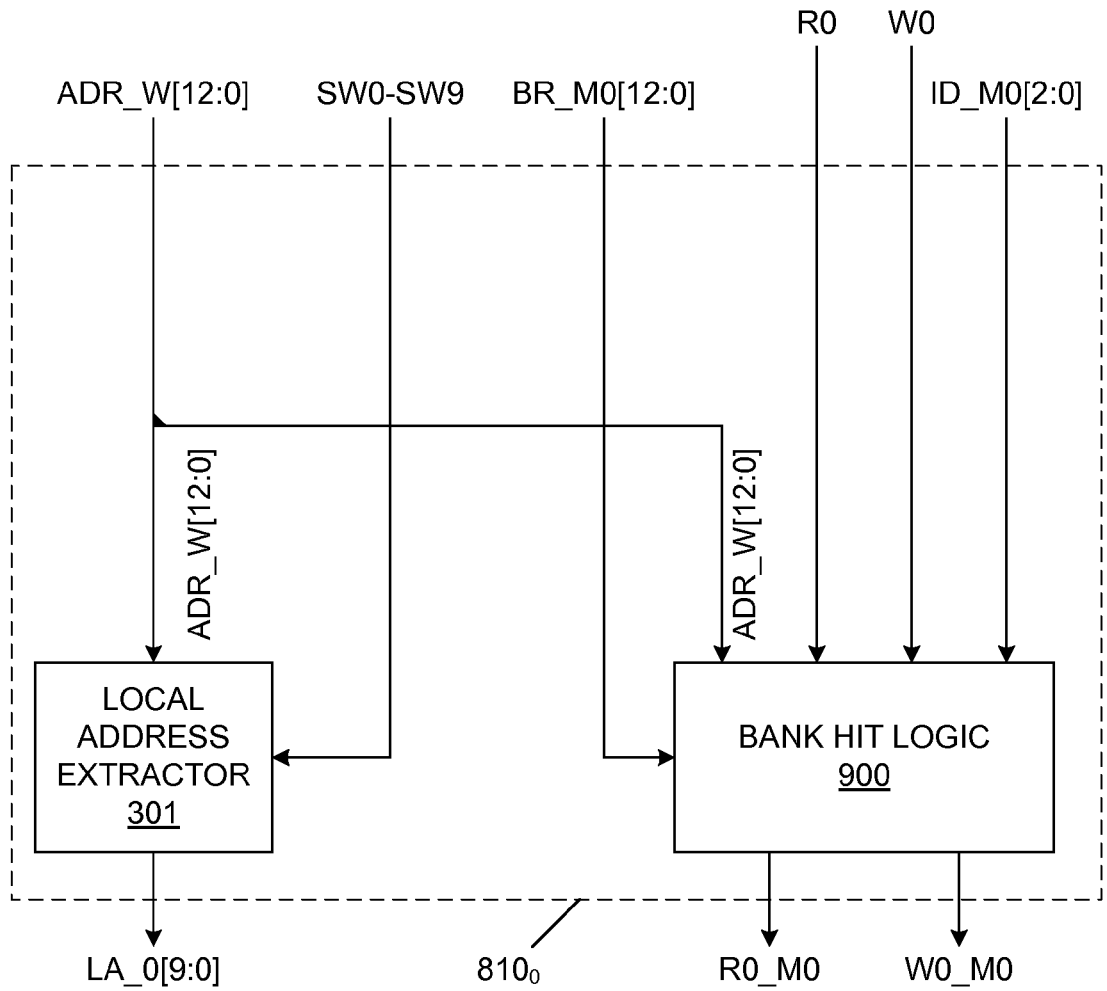
FIG. 9 is a block diagram of bank decoder logic present in the memory bank of FIG. 8 in accordance with one embodiment of the present invention.

FIG. 9 is a block diagram of bank decoder logic block $810_0$, which includes bank hit detection logic 900 and local address extractor 301 (which is described above in connection with FIG. 3).

Figure 10:
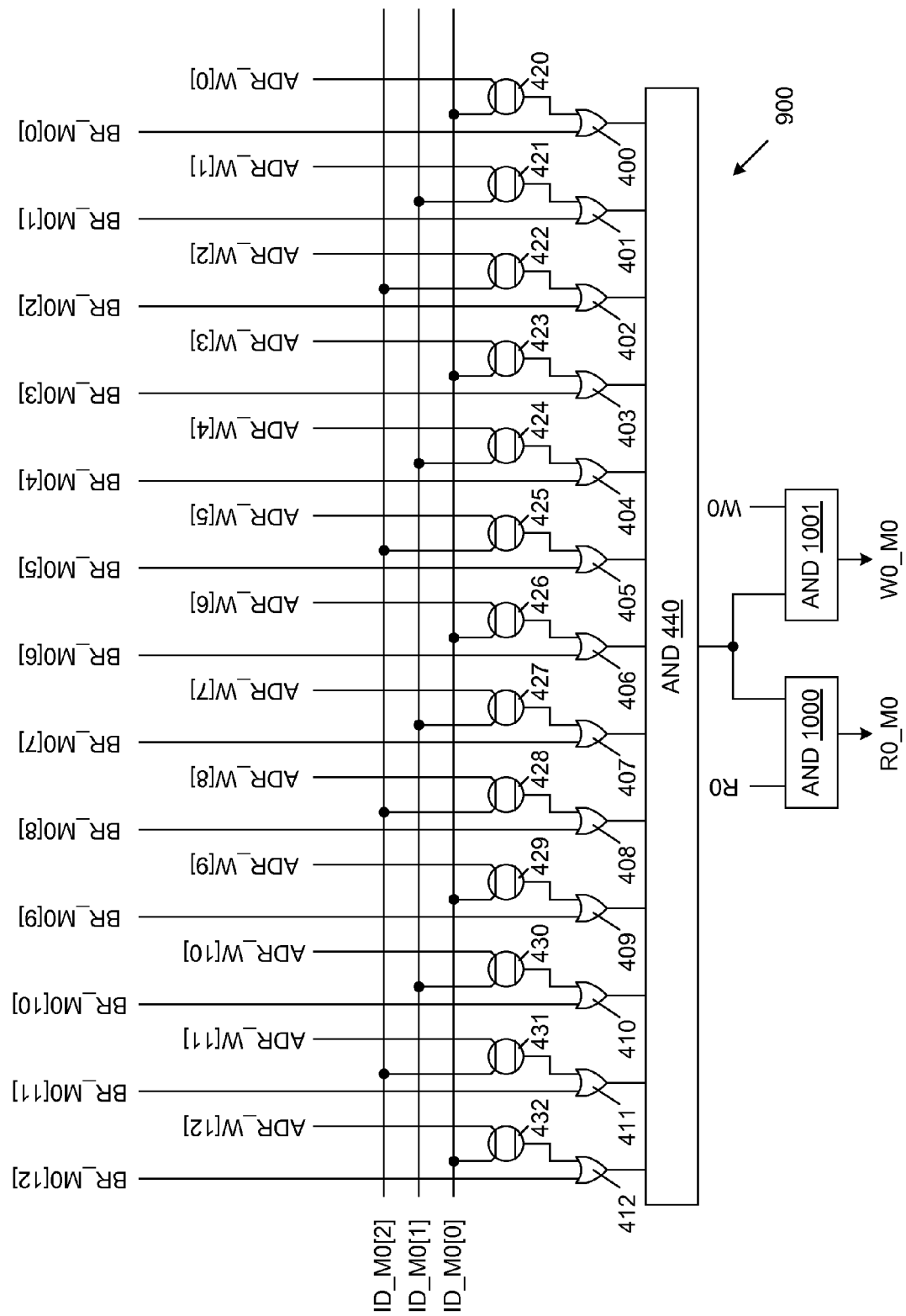
FIG. 10 is a circuit diagram of bank hit detection logic present in the bank decoder logic of FIG. 9 in accordance with one embodiment of the present invention.

FIG. 10 is a circuit diagram of bank hit detection logic 900 in accordance with one embodiment of the present invention. Because bank hit detection logic 900 is similar to bank hit detection logic 300, similar elements are labeled with similar reference numbers in FIGS. 10 and 4. Note that the logical AND gate 440 of bank detection logic 900 does not receive the write control signal W0. Rather, in bank detection logic 900, the output of logical AND gate 440 is provided to input terminals of logical AND gates 1000-1001. The other input terminals of logical AND gates 1000 and 1001 are coupled to receive the read control signal R0 and the write control signal W0, respectively, from the corresponding input register $800_0$. In response, logical AND gates 1000 and 1001 provide local read enable signal R0_M0 and local write enable signal W0_M0, respectively. The local read enable signal R0_M0 is activated when a read request on port $P_0$ hits memory bank $M_0$. Similarly, the local write enable signal $W_0$-$M_0$ is activated when a write request on port $P_0$ hits memory bank $M_0$.

Bank decoder logic blocks $810_1$-$810_M$ activate local read enable signals R1_M0-RM_M0, respectively, when read requests on the respective ports $P_1$-$P_M$ hit memory bank $M_0$. Similarly, bank decoder logic blocks $810_1$-$810_M$ activate local write enable signals W1_M0-WM_$M_0$, respectively, when write requests on the respective ports $P_1$-$P_M$ hit memory bank $M_0$.

The local read enable signals R0_M0 to RM_M0 and the local write enable signals W1_M0 to WM_M0 are provided to arbitration logic 814. Arbitration logic 814 operates in the same manner as arbitration logic 214 (FIG. 2), thereby causing multiplexer 813 to route the local address value LA_x associated with an active read/write access request on port $P_x$ or the refresh address REF_ADR0 associated with an active refresh request REF_REQ[0] (via the $SEL_0$ signal), and causing address decoder 215 to initiate read or write accesses to memory array 220 (via the $CTRL_0$ signal).

Multiplexer 840 receives the local write enable signals W0_M0 to WM_M0 from bank decoders $810_0$ to $810_M$, and the write values $W_{IN}0$ to $W_{IN}M$ from ECC blocks $715_0$ to $715_M$. When one of the local write enable signals Wx_M0 is activated, multiplexer 840 routes the corresponding write value $W_{IN}X$ to the sense amplifier/write driver circuit 230, thereby enabling the associated write operation to be performed.

Arbitration logic 814 also routes the local read enable signals R0_M0 to RM_M0 to read enable output registers $830_0$ to $830_M$, respectively. Read enable output registers $830_0$ to $830_M$, which are clocked by the internal clock signal $CLK_I$, provide the local read enable signals R0_M0 to RM_M0 to cross-bar network 730. Arbitration logic in memory banks $M_1$-$M_N$ provide similar sets of local read enable signals to cross-bar network 730.

Figure 11:
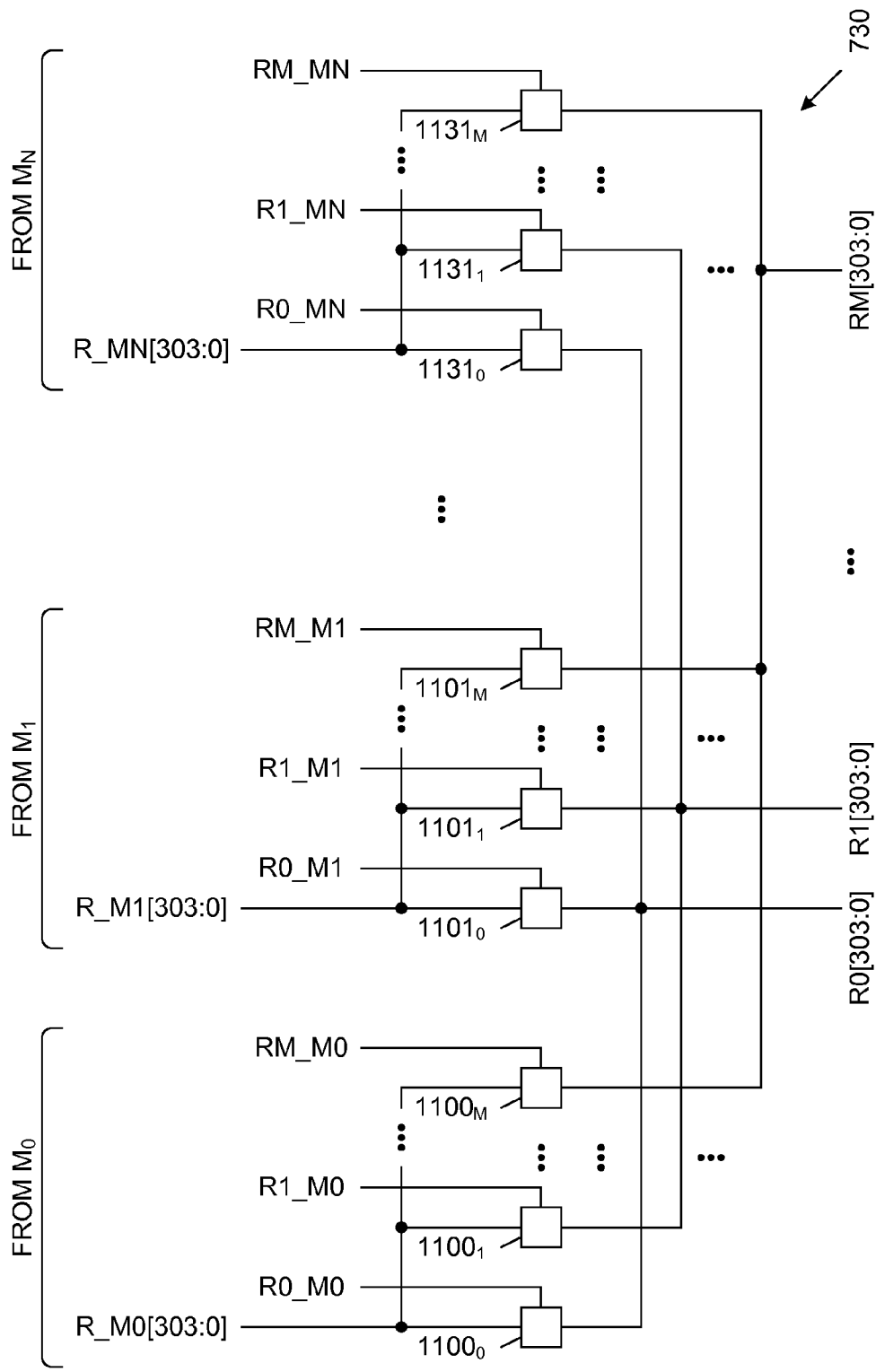
FIG. 11 is a block diagram of a cross-bar network present in the multi-port multi-bank memory system of FIG. 7 in accordance with one embodiment of the present invention.

FIG. 11 is a block diagram of cross-bar network 730 in accordance with one embodiment of the present invention. Cross-bar network 730 includes switching elements $1100_0$-$1100_M$, $1101_0$-$1101_M$, to $1131_0$-$1131_M$, which are connected as illustrated. Switching elements of cross-bar network 730 operate in the same manner as the switching elements of cross-bar network 130 (FIG. 6), thereby routing the values read from memory banks $M_0$-$M_N$ to the ports that initiated the corresponding read operations. For example, if a read operation initiated on port $P_1$ accesses memory bank $M_0$ then the read enable signal R1_M0 will be activated, thereby activating switching element $1100_1$. Under these conditions, switching element $1100_1$ causes the read value R_M0[303:0] provided by memory bank $M_0$ to be routed through cross-bar network 730 as the read output value R1[303:0].

Although the present invention has been described in connection with several embodiments, it is understood that this invention is not limited to the embodiments disclosed, but is capable of various modifications and embodiments which would be apparent to one of ordinary skill in the art. For example memory system 100 (or 700) may be fabricated as a stand-alone memory device, or as part of a system on a chip. Moreover, although the present invention has been described as including error detection and correction circuitry, it is understood that this circuitry can be omitted in other embodiments. It is, therefore, contemplated that the appended claims will cover any such modifications or embodiments as falling within the true scope of the invention.

I claim:

1. A memory system comprising:
   a plurality of ports, wherein each of the ports receives access requests, and wherein each of the ports registers the received access requests in response to a first clock signal;
   a memory core that includes a plurality of memory banks;
   a broadcast network that transmits each of the access requests received by each of the ports to each of the memory banks, wherein each of the access requests includes a bank address that specifies one of the memory banks, whereby a plurality of different memory banks are concurrently accessed in response to access requests received on a plurality of different ports; and
   a bank address remapping register that stores a bank address remapping value that identifies a location of the bank addresses within the received access requests, wherein the bank address remapping register stores different bank address remapping values to identify different locations of the bank addresses within the received access requests for different applications of the memory system.

2. The memory system of claim 1, wherein each memory bank comprises a storage element that stores a unique bank address that identifies the memory bank.

3. The memory system of claim 2, wherein each of the memory banks comprises a plurality of bank hit logic blocks, each associated with a corresponding one of the ports, wherein each of the bank hit logic blocks determines whether a bank address of a received access request matches the unique bank address stored in the storage element of the memory bank, wherein the bank hit logic block identifies the location of the bank address in the received access request in response to the bank address remapping value.

4. The memory system of claim 3, further comprising:
   switch logic that generates a switch value in response to the bank address remapping value; and
   a plurality of local address extractors within each of the memory banks, each associated with a corresponding one of the ports, wherein each of the local address extractors removes the bank address from the received access request in response to the switch value, thereby providing a local address that is used to access a memory array within the memory bank.

5. The memory system of claim 1, wherein each of the memory banks operates in response to a second clock signal, wherein the second clock signal has a frequency that is less than a frequency of the first clock signal.

6. The memory system of claim 5, wherein the second clock signal has a frequency that is half of a frequency of the first clock signal.

7. The memory system of claim 1, further comprising error correction code (ECC) circuitry associated with each of the ports.

8. The memory system of claim 1, wherein each of the memory banks includes a bank access controller that determines whether access requests received from two different ports concurrently specify accesses to the same memory bank.

9. The memory system of claim 1, wherein each of the ports has the same fixed access latency.

10. The memory system of claim 9, wherein the fixed access latency is specified by a plurality of cycles of the first clock signal.

11. The memory system of claim 1, further comprising a memory controller that provides the access requests to the plurality of ports, and also initiates refresh operations to the memory banks.

12. A method of operating a memory system comprising:
    providing access requests to a plurality of ports, wherein each of the ports operates in response to a first clock signal;
    accessing a plurality of memory banks in response to the access requests, wherein a plurality of different memory banks are concurrently accessed in response to a plurality of access requests received on a plurality of different ports, wherein each of the access requests includes a bank address that specifies one of the memory banks; and
    processing each of the plurality of access requests within the plurality of different memory banks with the same fixed latency;
    identifying a location of the bank addresses within the access requests in response to a bank address remapping value; and
    changing the bank address remapping value to identify different locations of the bank addresses within the received access requests for different applications of the memory system.

13. The method of claim 12, further comprising broadcasting each of the access requests received by each of the ports to each of the memory banks.

14. The method of claim 13, further comprising assigning a unique bank address to each of the memory banks.

15. The method of claim 14, further comprising:
    within each of the memory banks, comparing the unique bank address associated with the memory bank to multiple portions of a received access request; and
    using the bank address remapping value to select the results of one of the comparisons to determine whether the unique bank address matches the bank address of the received access request.

16. The method of claim 15, further comprising:
    generating a switch value in response to the bank address remapping value; and
    within each of the memory banks, removing the bank address from the received access request in response to the switch value, thereby providing a local address that is used to access a memory array within the memory bank.

17. The method of claim 12, further comprising operating each of the memory banks in response to a second clock signal, wherein the second clock signal has a frequency that is less than a frequency of the first clock signal.

18. The method of claim 17, wherein the second clock signal has a frequency that is half of a frequency of the first clock signal.

19. The method of claim 12, further comprising performing error correction code (ECC) processing for each of the access requests.

20. The method of claim 12, further comprising determining whether access requests received on two different ports concurrently specify accesses to the same memory bank.

21. The method of claim 12, wherein the fixed access latency is specified by a plurality of cycles of the first clock signal.

22. The method of claim 12, further comprising using a memory controller to provide the access requests to the plurality of ports, and also initiate refresh operations to the memory banks.

* * * * *